UNITED STATES PATENT OFFICE.

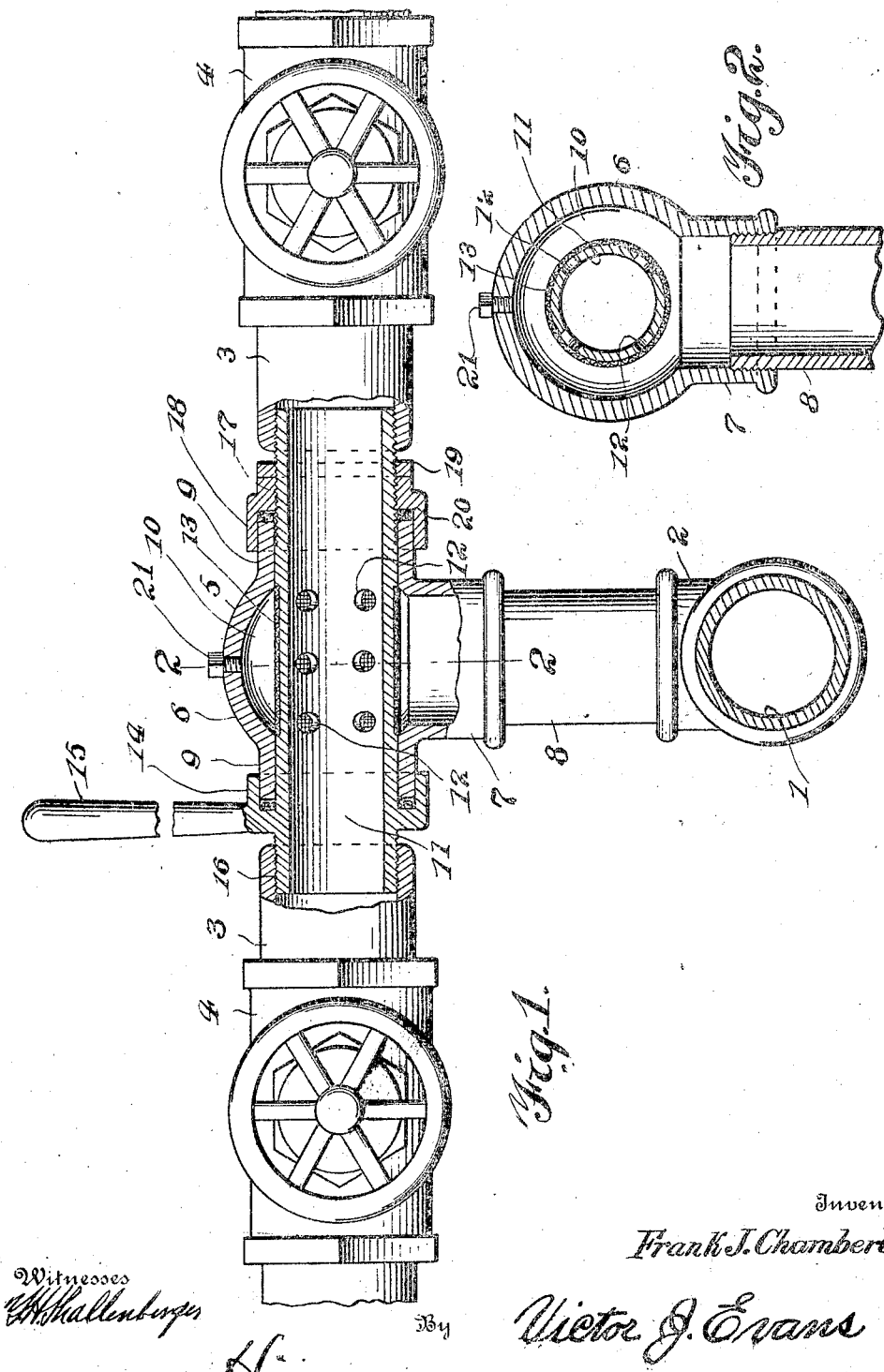

FRANK J. CHAMBERLIN, OF BATTLE CREEK, MICHIGAN.

IRRIGATION-UNION.

1,206,670.   Specification of Letters Patent.   Patented Nov. 28, 1916.

Application filed February 7, 1916. Serial No. 76,836.

*To all whom it may concern:*

Be it known that I, FRANK J. CHAMBERLIN, a citizen of the United States, residing at Battle Creek, in the county of Calhoun and State of Michigan, have invented new and useful Improvements in Irrigation-Unions, of which the following is a specification.

This invention relates to irrigation unions designed for use in irrigation systems of that kind wherein a main water feed pipe is connected with lateral spray pipes arranged in alinement with each other and adapted to be oscillated during the spraying action.

The object of the invention is to provide a union or connection between the main feed pipe and the lateral spray pipes, whereby the same will be coupled together, said connection also serving as an oscillatable support for the spray pipes and a valve controlling the flow of water thereto, by means of which both spray pipes may be simultaneously oscillated and the water supplied thereto, and whereby the number of parts or fittings necessary for the purpose is reduced to a material extent so as to simplify and reduce the cost of installing overhead irrigation systems of the character defined.

A further object of the invention is to provide a union or connection which is simple of construction, reliable and efficient in action, adapted to be readily and conveniently cleansed when occasion requires, which is proof against the leakage of water, and which may be readily applied and removed.

The invention consists of the features of construction, combination and arrangement of parts hereinafter fully described and claimed, reference being had to the accompanying drawing in which:—

Figure 1 is a section taken longitudinally through the union and at right angles to the main feed pipe and showing the parts in normal position. Fig. 2 is a sectional view on the line 2—2 of Fig. 1, taken in a direction parallel with the main feed pipe.

Referring to the drawings, 1 designates a main water feed pipe shown as consisting of sections united by a T-connection 2, and 3 designates lateral spray pipes projecting in opposite directions beyond the feed pipe and at right angles thereto. These spray pipes may be provided with controlling valves 4 to govern the flow of the water thereto.

My improved union comprises a T-connection 5, in the form of a substantially globular casing 6 having a depending inlet branch 7 which is internally threaded to receive a short pipe 8 connecting the same with the union 2, and which is provided with lateral outlet branches 9 arranged in alinement with each other, and which outlet branches have cylindrical bores or passages of the same diameter as each other and of materially less diameter than that of the body of the casing. The body of the casing thus forms an enlarged water circulating chamber 10 to supply water in proper volume to supply the pipes 3 for the sprinkling action.

Extending longitudinally through the union 5 is a supporting and conducting tube 11, which tube extends across the casing 10 and outwardly through and beyond the lateral outlets 9. This tube is provided at an intermediate point with ports 12 communicating with the chamber 10, whereby the water from the main feed pipe is caused to first enter the chamber 10 and then find its way through the ports 12 into the tube 11. The outer face of the central portion of the tube in which the ports 12 are formed is recessed to receive a strainer 13 by means of which all foreign or refuse material flowing with the water will be prevented from passing into the tube 11 and will be retained within the chamber 10 and caused to pass back to and through the feed pipe.

One end of the tube 11 is formed with a packing gland 14 and a lever handle 15, and beyond said gland said end of the tube is externally threaded, as at 16, for connection with the adjacent sprinkler pipe 3, while the other end of the tube is threaded for the major portion of its length, as indicated at 17, and is engaged at its outer end with the other sprinkler pipe 3, by means of which the two sprinkler pipes are connected with and supported by the tube 11, as will be readily understood. On the threaded end 17 of the tube 11 is a gland 18 which is threaded for adjustable engagement therewith and is adapted to be held in adjusted position by means of a lock nut 19, and between the two glands 14 and 18 and the adjacent ends of the respective outlets 9 are interposed packings 20, whereby the outlets are sealed against the escaping water between the same and the tube. By adjusting the gland 18 the tube 11 may be moved longitudinally within the union casing, so that both glands will be simultaneously adjusted to draw up the packings and thereby keep the same tight and proof against leakage. In the top portion of the casing of the union is a flushing opening closed by a plug 21, by means of which the chamber 10 may be flushed whenever required to free the same from any accumulated deposits.

It will be seen from the foregoing description that the tube 11, which is mounted to turn or oscillate within the body of the union, through the medium of the lever handle 15, forms a support for the spray pipes 3 and also a conductor connecting said pipes with the main feed pipe through the union, so that upon opening the valves 4 and oscillating the tube 11 by means of the lever 15 both pipes 3 will also be oscillated and water will be supplied thereto through the ports 12 for the sprinkling action. By this construction the device is adapted to perform the dual function of an oscillating element and a union or conducting connection between the spray pipes and the main feed pipe, whereby one or more fittings of the character commonly employed may be dispensed with at a material saving of time and labor as well as in the number of parts required in the erection of irrigation systems of the character described. The device also provides a means by which both sprinkler pipes may be simultaneously oscillated, whereby greater convenience and a saving in time and labor in operating said pipe is afforded over other systems.

I claim:—

In an irrigation system, a main feed pipe, a T-connection communicating therewith, a tube extending through and journaled in said connection, said tube having its ends projecting beyond the lateral outlets of the connection and being provided with openings connecting the interior of said tube with the feed pipe, sprinkler pipes connected with the ends of the tube, a gland integral with one of the projecting ends of the tube, a gland adjustable upon the other end of the tube, said glands embracing the outlets of the casing, packing between the glands and outlets of the casing, and a lever carried by the integral gland.

In testimony whereof I affix my signature in presence of two witnesses.

FRANK J. CHAMBERLIN.

Witnesses:
ABBIE K. NORTON,
BESSIE E. FAGAN.